United States Patent Office 3,237,476
Patented Mar. 1, 1966

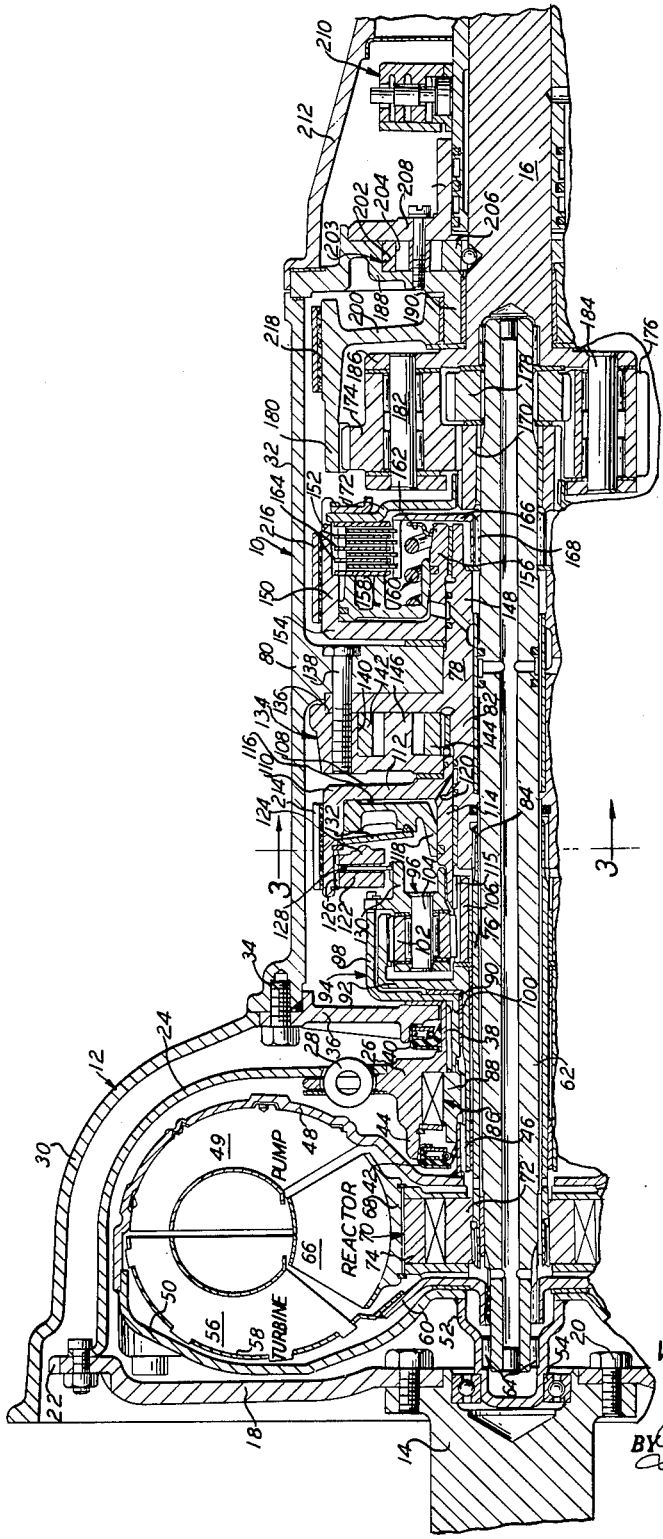

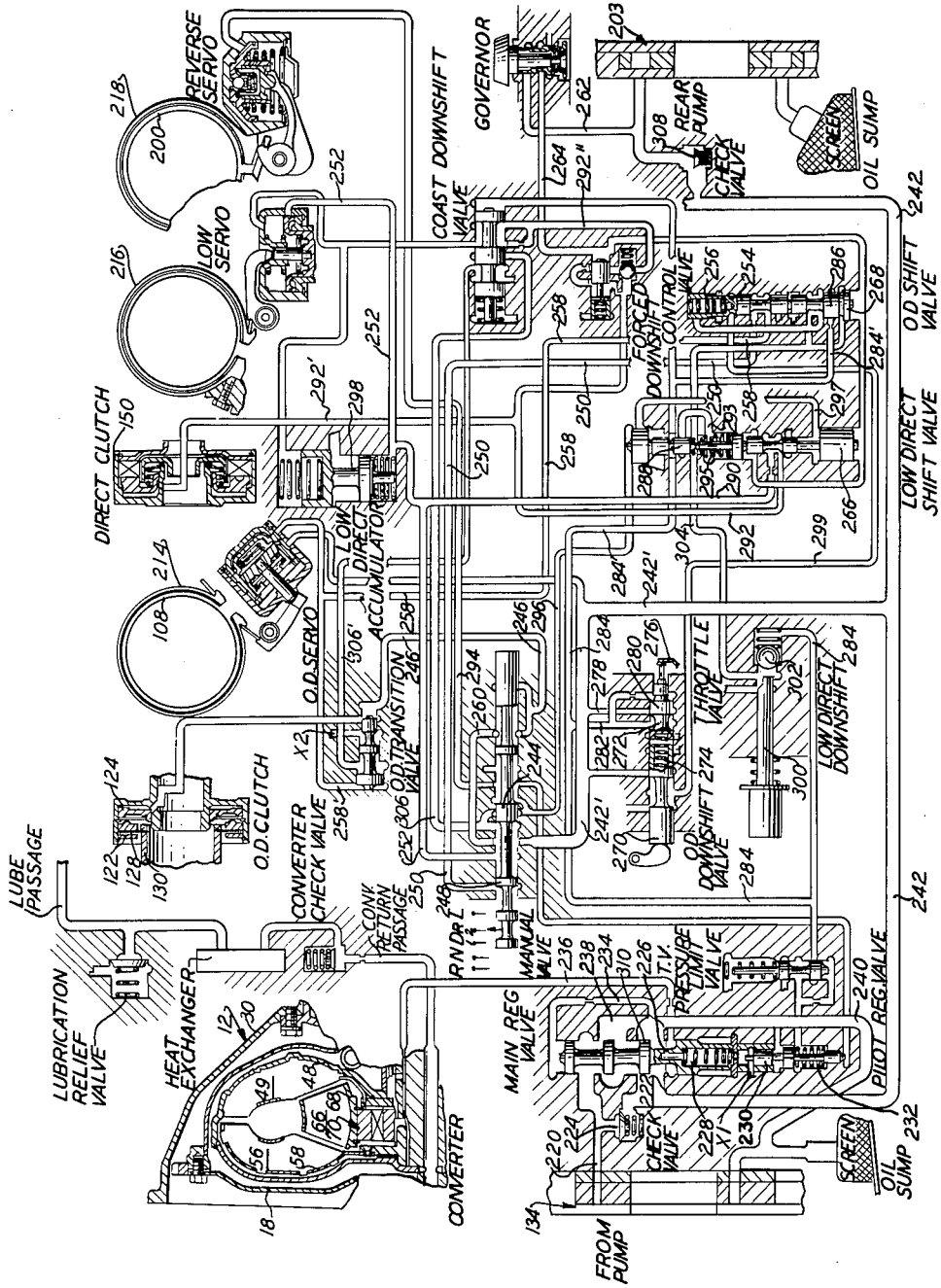

3,237,476
AUTOMATIC POWER TRANSMISSION
MECHANISM
Vladimir J. Jandasek, Dearborn, Mich., assignor to Ford
Motor Company, Dearborn, Mich., a corporation of
Delaware
Original application Aug. 29, 1956, Ser. No. 606,897, now
Patent No. 3,078,740, dated Feb. 26, 1963. Divided
and this application Feb. 11, 1963, Ser. No. 257,509
6 Claims. (Cl. 74—472)

This application is a division of my pending application S.N. 606,897, filed August 29, 1956, now Patent No. 3,078,740.

My invention relates generally to improvements in power transmission mechanisms, and more particularly to a multiple speed ratio power transmission mechanism capable of being used in an automotive vehicle driveline.

In a preferred embodiment of my invention I have provided a three element hydrokinetic torque converter. The turbine member of the torque converter is connected drivably to a power input gear element of a main multiple speed ratio gear unit, the power output element of which is connected to a driven shaft. Clutch and brake means are provided for controlling the relative motion of the elements of the main gear unit to provide plural forward driving torque delivery paths of different ratios and a reverse drive ratio.

An overdrive gear unit is situated in the power flow path between the vehicle engine and the impeller of the torque converter. A friction clutch and a friction brake are employed for controlling the relative motion of the elements of the overdrive gear unit. During operation in overdrive, the sun gear element of the overdrive gear unit is anchored by the friction brake. During operation in the lower driving speed ratios, however, the friction brake is released and the associated clutch is applied thereby locking up the elements of the overdrive gear unit for rotation in unison. When the overdrive clutch is applied, an overrunning coupling situated between an engine driven drive shell and the impeller member of the converter creates a one way forward driving torque delivery path that bypasses the overdrive gear unit. During engine braking or coasting, however, the overdrive gear unit functions as part of a torque delivery path between the turbine shaft and the engine driven drive member since the overrunning coupling is incapable of delivering torque in a reverse direction.

According to a feature of my invention, the overdrive clutch and brake members are actuated by fluid pressure responsive servos that are pressurized by a fluid pressure source such as an engine driven pump or a tailshaft driven pump. Conduit structure is arranged between the pressure source and the servos. Distribution of pressure through the conduit structure is controlled by a shift valve that responds to control variables such as an engine torque demand signal and a vehicle speed signal. As the shift valve is actuated on an upshift, pressure is made available to the overdrive brake servo. A branch portion of the conduit structure supplies pressure from the same source to the overdrive clutch servo although the fluid flow path that extends to the overdrive clutch servo is defined in part by a transition valve which is sensitive to pressure build-up in the brake servo. The transition valve thus will respond to a pressure build-up in the brake servo to release the clutch thereby preventing simultaneous application of the clutch and the brake.

According to another feature of my invention, I have provided a means for obtaining a desired degree of overlap in the operation of the overdrive clutch and brake thereby providing a synchronous shift between the clutch and the brake when a shift to the overdrive ratio is initiated under minimum or zero torque conditions. Thus, the desired timing during a zero torque shift to the overdrive ratio can be obtained regardless of the different timing requirements for a corresponding upshift under driving torque delivery conditions. The transition valve also provides proper timing of the release of the overdrive brake and the application of the overdrive clutch on a downshift from the overdrive ratio.

According to another feature of my invention, I have provided a new and improved transmission structure having fluid pressure operated gear control elements and a fluid control valve circuit for automatically and selectively energizing the various control elements to obtain a desired shift sequence. The control circuit includes a front engine driven pump and a rear tailshaft driven pump as above described wherein the front pump is coupled drivably to an engine driven member through one of the gear subassemblies of the transmission. This valve circuit includes portions that control also the application and release of the overdrive friction clutch and brake.

The provision of a transmission control mechanism of the type above described being a principal object of my invention, it is a further object of my invention to provide a new and improved automatic transmission control mechanism wherein the overdrive ratio of the overdrive gear unit may be combined with a speed ratio of the main gear assembly to increase the overall ratio range.

It is another object of my invention to provide clutch and brake structure for the overdrive gear unit that may act in cooperation with an overrunning coupling to control the relative motion of the elements of the overdrive gear unit.

It is another object of my invention to provide a timing valve circuit for regulating the engagement and release pattern for the overdrive gear unit so that a smooth ratio shift may be obtained under varying driving conditions.

It is a further object of my invention to provide a simplified automatic transmission control mechanism that may be adapted readily for use with a variety of multiple speed transmissions.

Further objects and features of my invention will readily become apparent from the following description and from the accompanying drawings.

In carrying forth the foregoing objects, I have provided an automatic multiple speed ratio transmission having planetary gear elements and clutch and brake means for controlling the relative motion of the gear elements to effect the various transmission speed ratios, one of the ratios of the presently disclosed embodiment of my invention being an overdrive. A hydrokinetic unit is situated in the power train between the engine and the above mentioned gear elements, said unit including a turbine or runner and an impeller or pump defining at least in part a hydrokinetic torus circuit.

The engine crankshaft is connected to the carrier member of a first planetary gear unit and the turbine member of the hydrokinetic unit is connected to a power input element of the main gear unit of the transmission. The impeller or pump member is connected to the ring gear of the first planetary unit. Means are provided for selectively braking the sun gear of the first planetary unit to provide an overspeeding of the pump member of the hydrokinetic unit with respect to the engine crankshaft.

A control circuit of the type previously described may be provided and the front pump thereof may be drivably coupled to the sun gear of the above mentioned first planetary unit. A brake drum member is joined to the sun gear, and by preference it forms a portion of a connection between the sun gear and the front pump. A brake band may encircle the brake drum and it may be applied when braking of the sun gear is desired. When the sun gear is so braked an overdrive is accomplished through the first planetary unit and the front pump is rendered inoperative. Other clutch and brake means are provided for controlling the motion of the remaining planetary gear portions of the mechanism to produce additional ratios.

For the purpose of more particularly describing the principal features of my invention, reference will be made to the accompanying drawings wherein:

FIGURE 1 shows a cross sectional assembly view of a multiple speed ratio automatic transmission embodying the improvements of my invention; and FIGURE 2 is a schematic representation of a fluid control valve circuit capable of controlling the planetary gear portions of the assembly of FIGURE 1.

Referring first to the assembly view of FIGURE 1, numeral 10 is used to designate generally the above described planetary gear portions of the transmission mechanism, and numeral 12 is used to designate generally the location of a hydrokinetic torque converter. A power input shaft, which may be the crank-shaft of an internal combustion engine, is designated by numeral 14, and a power output tailshaft is designated by numeral 16. The planetary gear portion 10 and the hydrokinetic unit 12 form a power flow path between the shafts 14 and 16.

A drive plate 18 is secured centrally to the power input shaft 14 by means of bolts 20, and the periphery of the plate 18 is formed with an external ring gear 22 capable of engaging an electric starter motor pinion, not shown, for cranking the engine during starting. The periphery of the drive plate 18 is secured to a drive member 24 which may be coupled to a one-way clutch member 26 by means of a resilient coupling 28 of conventional construction, said coupling 28 being adapted to function as a vibration damping means and to accommodate a limted amount of restrained movement between the drive member 24 with respect to the clutch member 26.

The hydrokinetic unit 12 is enclosed within a suitable casing 30 which may be secured about its outer periphery to the cylnider block of the internal combustion engine with which the transmission is used, and the planetary gear portion 10 of the transmission mechanism is enclosed by a somewhat narrower casing 32 which may be secured to the rear of the casing 30 by suitable bolts 34. A partition wall 36 is situated at the juncture between the casings 30 and 32 and is centrally apertured to receive an extension 38 of the clutch member 26, a suitable fluid seal 40 being positioned within the central opening for preventing oil from passing from the interior of casing 32 to the interior of casing 30. Similarly, a fluid seal member 42 may be positioned on the other side of the clutch member 26 between a seal retaining shoulder 44 and an extension 46 secured to the hub formed on the outer shroud of a pump or impeller member 49 of the hydrokinetic unit 12. The outer periphery of the pump shroud 48 may be joined to the periphery of a bell shaped support member 50, the later being joined at the center thereof to a pilot member 52 which is adapted to be journaled rotatably in a central recess formed in the power input shaft 14, a suitable bearing 54 being provided for this purpose.

The hydrokinetic unit 12 further includes a turbine member 56 situated in juxtaposed relationship with respect to the pump member 49. It includes an outer shroud 58 having a hub member 60 which is splined or otherwise positively secured to a central power shaft 62. By preference, the end of the shaft 62 may be rotatably journaled within the pilot member 52 by suitable bearings 64.

The hydrokinetic unit 12 further includes a reactor or stator member 66 having a hub 68 within which is positioned a one-way brake assembly 70 having inner and outer races as indicated at 72 and 74 respectively, the inner race 72 being splined to a relatively stationary sleeve shaft 76 which extends axially to a relatively stationary adapter 78 secured to a transverse wall 80 of the transmision casing 10, said adapter 78 having an extension 82 which is connected to the sleeve shaft 76 by means of a splined connection 84.

The clutch element 26 forms a portion of the one-way clutch assembly generally designated in FIGURE 1 by numeral 86, and it includes an inner race 88 which may be splined to a sleeve 90 concentrically disposed about shafts 62 and 76. The sleeve 90 is joined positively to the hub of a ring gear member 92 of a first planetary unit generally designated in FIGURE 1 by numeral 94. The planetary unit 94 includes a carrier assembly 96 which is connected to a drum shaped drive member 98 having an axially extending sleeve 100 which forms a central hub, said sleeve 100 being splined to the clutch member 26 as indicated. The carrier assembly 96 includes a plurality of planet gears 102 rotatably journaled on individual pinion shafts 104 and concentrically positioned about the axis of the power shaft 62. The planetary pinions 102 drivably engage the internal ring gear member 92 and a centrally positioned sun gear 106, the latter being journaled on the aforementioned sleeve shaft 76 by a suitable bushing.

A brake drum member 108 is rotatably journaled on the aforementioned extension 82 of the stationary adapter 78 and is formed with a cylindrical portion 110, a radial portion 112 and a central hub portion 114, the latter being positively splined to sun gear 106 as indicated at 115. The drum member 108 defines an annular cylinder 116 within which may be positioned an annular piston member 118, said piston member cooperating with the walls of the cylinder 116 to define a fluid working chamber to which fluid pressure may be admitted by means of a pressure passage 120 communicating with a portion of the control circuit which will subsequently be described with reference to FIGURE 2. The inner periphery of the cylindrical portion 110 of the drum member 108 carries a pair of spaced clutch plates 122 and 124 as indicated, suitable splines being formed for this purpose on the cylindrical portion 110 and on the outer margin of the clutch plates 122 and 124 as indicated at 126. A clutch disc 128 is positioned between the clutch plates 122 and 124 and is carried by an extension 130 formed on the carrier assembly 96. A coned spring disc 132 is located between the movable piston 118 and a clutch plate 124 so that the fluid pressure force exerted on the piston 118 will be transferred to the clutch plate 124 thereby urging the latter into frictional engagement with the clutch disc 128 and clutching the carrier assembly 96 to the sun gear 106, the clutch plate 122 providing the required reaction.

The aforementioned front pump is shown in FIGURE 1 at 134. It comprises an outer pump casing 136 secured to the transverse wall 80 of the casing 10 by means of ports 138. The casing 136 is formed with a recess 140 within which is positioned an internal pump gear 142, said recess being defined in part by the adjacent wall of the adapter 78. An external pump gear 144 is positioned in the recess 140 in driving engagement with the gear 142, the latter being eccentric with respect to the former thereby defining a crescent shaped space therebetween within which a correspondingly shaped section 146 of the casing 136 is located. Suitable intake and delivery ports are provided for the front pump in a conventional manner although they are not illustrated in the drawing.

The adapter 78 is further formed with an extension 148 received through the central aperture formed in the transverse wall 80. A brake member 150 is rotatably supported by the extension 148 and comprises a drum portion 152, a radial portion 154 and a hub portion 156. The brake member 150 defines an annular cylinder within which is positioned an annular piston 158 which is urged in a left hand direction by compression spring 160 interposed between the piston 158 and the spring seat 162. A multiple disc clutch assembly 164 is located adjacent the movable piston 158. It is comprised of a series of clutch discs positively splined to the inner periphery of the cylindrical portion 152 of the brake member 150. A series of alternately spaced clutch discs is carried by a clutch member 166 which is splined to the central power shaft 62 as indicated at 168.

A planetary sun gear 170 is rotatably journaled on the power shaft 62 and is positively coupled to an end plate 172 of the multiple disc clutch assembly. The sun gear 170 drivably engages a plurality of planet gears 174 which in turn are intermeshed with alternately spaced planet gears 176, the latter drivably engaging a planetary sun gear 178 and the former drivably engaging a ring gear 180. The planet gears 174 and 176 are rotatably journaled on pinion shafts 182 and 184, respectively, which in turn form a portion of the planetary carrier assembly generally designated by numeral 186. The carrier assembly 186 in turn is joined integrally to the previously mentioned power output shaft 16. A transverse end wall 188 is formed within the transmission casing 10 and carries a support 190 on which a brake drum 200 is rotatably journaled, said brake drum 200 carrying the aforementioned ring gear 180.

The rear of the end wall 188 is recessed as shown at 202 and a positive displacement gear type pump 203 is positioned therein as indicated, said pump including an internal gear 204 and an external driving gear 206. The gears 204 and 206 are eccentrically located in driving relationship in a conventional manner, and suitable intake and delivery ports may be formed in the surrounding housing although they are not illustrated in the drawing. End plate 208 is secured to the end wall 188 and defines one side of the pump casing for pump gears 204 and 206.

A centrifugal governor valve mechanism, illustrated at 210, is rotatably carried by the tailshaft 16. It includes a radially movable valve element which is influenced by centrifugal force to provide a vehicle speed signal. The governor 210 forms a portion of the transmission controls which subsequently will be described with reference to FIGURE 2. The tailshaft 16 and the governor 210 are enclosed by a rear transmission casing 212 which may be joined to the rear of the casing 32 as illustrated.

In addition to the disc type clutch assemblies previously described, the relative motion of the planetary gear elements may be controlled by three brake bands illustrated at 214, 216 and 218, the band 214 encircling the drum portion 110 of the brake portion 108, the band 216 encircling the drum portion 152 of the brake member 150 and the band 218 encircling the drum 200. These brake bands may be applied selectively by fluid pressure operated brake servos.

The transmission structure illustrated in FIGURE 1 may be conditioned for low speed operation by engaging the front clutch and the center brake band 216 while the remaining clutch and brake elements remain de-energized. It thus will be apparent that power will be delivered from the engine crankshaft 14 to the converter pump member 49 through the drive plate 18, through the drive member 24 and through the one-way clutch 86. The rotating pump member 49 creates fluid circulation in the converter torus circuits thereby imparting a drive torque to the turbine member 56 which is transferred to the power shaft 62 and the sun gear 178. The sun gear 170 will remain stationary and the carrier 186 will be driven in the same direction as the direction of the rotation of the sun gear 178 at a reduced speed ratio.

To condition the transmission mechanism for direct drive or second speed ratio operation, the front and rear clutches are both energized and the center brake band is de-energized, the other two brake bands remaining de-energized as before. It will thus be apparent that the sun gear 170 will be locked to sun gear 178 through the rear multiple disc clutch assembly and the power transferred to the turbine member 56 by the pump member 49 of the converter will be transferred to the power shaft 62 and to the power output shaft 16 with a one-to-one driving ratio.

To condition the transmission for overdrive operation the front clutch is de-energized and the front brake band is energized while the rear clutch remains energized and the center and rear brake bands remain de-energized as before. It will be apparent that power will be transferred from the engine crankshaft 14 to the carrier member 96 of the front planetary unit through the drive member 98 and through the clutch member 26. Since the sun gear 106 of the front planetary unit is braked by the brake band 214, the ring gear member 92 of the front planetary unit will overspeed the carrier 96. The converter pump member 49 then will be driven by the engine crankshaft 14 with an overdrive speed ratio. The power thus delivered to the turbine member 56 will be transferred to the power shaft 62 and to the tail shaft 16 as in direct drive operation, the overall speed ratio of the transmission being equal to the overdrive ratio of the front planetary unit. The one-way clutch 86 is capable of accommodating an overspeeding of the sleeve 90 and the inner clutch race 88 with respect to the clutch member 26 during this overdrive operation, but it prevents an overspeeding of the clutch member 26 with respect to the inner race 88.

During direct drive and low speed operation, the clutch member 26 and the inner race 88 will turn as a unit since power will be delivered directly through the one-way clutch 86. The elements of the front planetary unit 94 will turn also as a unit since the ring gear unit 92 and carrier member 96 assume the speed of the race 88 and the clutch member 26 respectively to prevent an overspeeding of the sun gear 106 and the planet gears 102 of the front planetary unit 104 during deceleration. The carrier member 96 is clutched to the sun gear 106 by means of the disc clutch assembly 122, 124 and 128 during low speed and direct drive operation although it is not necessary that it form a portion of the power flow train of the transmission under these conditions.

To effect reverse drive the front clutch and the rear brake band are both energized while the rear clutch and the front and center brake bands are de-energized. It is thus seen that power will be transferred through the one-way clutch 86 to the pump member 49 which drives the turbine member 56 and the power shaft 62. The power is then transmitted through the planetary gears 178, 176 and 174 to the planetary carrier 186 and the power output shaft 16. Since the ring gear 180 is held stationary by the reverse brake band 218 and the carrier 186 will be driven in a reverse direction.

It is thus seen that brake band 214 is energized only when the transmission mechanism is operated in overdrive. Since the driving gear 144 of the front pump 134 is drivably coupled to the brake member 108, the front pump is operative only during operation in the low and high speed ranges and in reverse, but it is inoperative during overdrive operation.

For the purpose of describing the functions of the principal elements of the control valve circuit, reference will be made to FIGURE 2 wherein numeral 220 is used to designate the front pump discharge passage which extends to the inlet opening 222 of the main regulator valve through a one-way check valve 224. The main regulator valve comprises a multiple land valve spool slidably disposed in a cooperating valve chamber, said valve element including a flow metering orifice 226 for admitting fluid pressure to the chamber 228 situated at the lower end of the valve spool, said chamber 228 accommodating a valve spring which urges the regulator valve element in an upward direction.

The chamber 228 of the main regulator valve communicates with the upper end of pilot regulator valve chamber within which is positioned slidably a pilot regulator valve element 230 which controls the degree of communication between the pilot regulator valve chamber and a communicating exhaust port designated by the symbol "$X_1$." The pilot regulator valve element is urged in an upward direction by the pilot regulator valve spring 232 against the opposing force due to the fluid pressure acting on the upper end thereof. When the front pump discharge pressure increases to a value that approaches the desired control pressure, the pilot regulator valve 230 opens the adjacent exhaust port thereby permitting circulation of fluid through a flow metering orifice 226 and the chamber 228. This flow through the orifice 226 creates a pressure differential thereacross which is transmitted to opposed sides of the main regulator valve element, a passage 234 extending to the upper side of the valve element for this purpose. At some predetermined pressure differential, a converter fluid supply passage 236 will be uncovered by an adjacent valve land of the main regulator valve element to permit the converter to become charged with a charge pressure sufficient to accommodate a transfer of torque from converter pump member 49 to the turbine member 56 and to establish a converter torus flow. Upon a further build up in pressure differential across the orifice 226, the land 238 will uncover its adjacent valve seat to permit communication between the pump discharge passage 220 and a bypass passage 240 extending to the intake side of the front pump 134. It thus is seen that the pump discharge pressure will be regulated at a predetermined value and any increase in the speed of the front pump will be accompanied by an increase in the bypass flow, but there will be no corresponding increase in the discharge pressure. It will be apparent also that the magnitude of the pressure level at which the main regulator valve will function will be determined by the characteristics of the pilot regulator valve.

The regulated control pressure is supplied to control pressure passage 242 which extends to the manual valve through a communicating control pressure passage 242'. The manual valve comprises a multiple land valve element capable of assuming any of a plurality of positions relative to the valve chamber with which it cooperates to condition the transmission for the various drive ranges. If it is assumed that the manual valve element is shifted to a neutral position designated in FIGURE 2 by letter "N," the land 244 of the manual valve element will prevent control pressure from reaching the various pressure passages of the circuit although control pressure will be allowed to pass to the overdrive clutch through pressure passage 246 to maintain the front clutch in engagement whenever the vehicle engine and the front pump are operating. Since control pressure is prevented from reaching the direct drive clutch and the servos associated with the three brake bands, the various gear elements of the transmission mechanism will be free to rotate without an accompanying torque transfer therethrough.

When the manual valve element is shifted to the drive range position designated by numeral "DR–1," the valve land 248 will close the end of the valve chamber associated with the manual valve element, and control pressure will be transferred through the manual valve chamber from passage 242' to passages 250 and 252, the latter extending to the apply side of the low speed servo and the former extending to the overdrive shift valve which includes a movable valve element having a valve land 254 adapted to block the passage 250 when the valve element assumes a downward position under the influence of the overdrive shift valve spring 256.

As will subsequently be explained, the overdrive shift valve, which may be described as a fluid pressure distributor valve, assumes an upward position during overdrive operation thereby causing passage 250 to communicate with passage 258 extending to the apply side of the overdrive servo. On the other hand, if the manual valve assumes the drive position designated by the numeral "DR–2," passage 250 will be opened to exhaust thereby making it impossible for the passage 258 and the apply side of the overdrive servo to become pressurized with control pressure. It is thus apparent that the overdrive speed range may be either eliminated or included in the automatic shift sequence as desired depending upon the drive range position which the vehicle operator chooses.

For purposes of demonstrating the operation of the control valve circuit, it will be assumed that the manual valve element is shifted to drive range position "DR–1" and it will be assumed that the vehicle is accelerating from a standing start to a relatively high road speed for various throttle settings.

When the manual valve element assumes a first drive position, regulated control pressure is transferred from passage 242' to passage 252 thus energizing the low speed servo and causing brake band 216 to brake the brake member 150. Simultaneously, fluid pressure is transferred to branch passage 260 which communicates through the manual valve with the previously mentioned passage 246 extending to th front clutch which locks the carrier member 96 to the sun gear 106 of the front planetary unit to prevent overspeeding of the elements of the planetary units during engine braking. Since the transmission then is conditioned for low speed operation, powel will be transferred to the traction wheels of the vehicle and the vehicle will accelerate thus causing the rear pump 203 and the tailshaft mounted governor to function.

Pressurized fluid is supplied to the governor by the rear pump 203 through passage 262, and speed sensitive governor pressure is delivered from the governor through a passage 264 which communicates with the lower end of the low direct shift valve and the lower end of the overdrive shift valve to urge the same in an upward direction against the opposing force of the respective shift valve springs, the low direct shift valve and the overdrive shift valve being provided with appropriate valve lands 266 and 268, respectively, upon which governor pressure is caused to act. Like the overdrive shift valve, the low direct shift valve also may be described as a fluid pressure distributor valve.

Referring next to the throttle valve illustrated in FIGURE 2, it is seen that it comprises a pair of valve plungers 270 and 272, the former being acted upon by a conventional engine throttle linkage. A throttle valve spring 274 is interposed between the valve elements 270 and 272 for exerting a force on the valve element 272 which is proportional in magnitude to the degree of engine throttle opening. A suitable spring element 276 may be employed for urging the valve element 272 in the opposite direction. Regulated control pressure is supplied to the throttle valve through passage 278, and the degree of communication between passage 278 and the throttle valve chamber is controlled by a throttle valve land 280 as illustrated. A throttle pressure passage 282 communicates with the throttle valve chamber and is adapted to deliver throttle pressure to throttle pressure passage 284 extending to one side of a low-direct downshift valve, to a branch passage 284' extending to the upper side of the overdrive shift valve land 286, to a spring chamber on the upper side of the overdrive shift valve and to one side of a coast downshift valve. Throttle pressure passage 284 further communicates with the upper side of a throttle pressure reducer valve 288. The reduced throttle pressure output of valve 288 exerts forces on the low direct shift valve and on the overdrive shift valve that oppose the forces exerted by the governor pressure. It thus is apparent that the shift valves will be actuated at various vehicle speeds depending upon the magnitude of the throttle pressure which in turn is dependent upon the engine throttle setting, the latter being an indication of the magnitude of the engine torque demand.

Throttle pressure is transferred also to the lower end of the pilot regulator valve so that the characteristics thereof may be dependent upon the engine throttle setting which in turn is an indicator of engine torque demand. When the engine torque demand is high, the pilot regulator valve causes the main regulator valve to maintain a higher control pressure in the circuit to adapt the transmission clutch and brake means to accommodate the increased torque requirements of the transmission.

When the vehicle accelerates to a speed which is sufficiently large to cause the low direct shift valve to move in an upward direction for a given throttle setting, pressure passage 290 will be caused to communicate with passage 292, the former communicating with the aforementioned control pressure passage 252 and the latter communicating with the direct drive clutch through branch passage 292' and with the release side of the low speed servo through branch passage 292" for the brake band 216. The transmission thus is conditioned for direct drive operation as previously explained since the direct drive clutch is energized and the low speed servo is released, the front clutch remaining energized as before.

Upon a further increase in vehicle speed for any given engine throttle setting the magnitude of the governor pressure will increase until the overdrive shift valve is urged in an upward direction thereby causing communication between passages 250 and previously exhausted passage 258, the latter extending to the apply side of the overdrive servo to energize the brake band 214. Simultaneously, fluid pressure is transferred to the left side of the overdrive transition valve through a branch passage 258' to cause the transition valve to shift to the right and to block the aforementioned passage 246 thereby causing the front clutch to become de-energized. The overdrive transition valve also functions to exhaust the front clutch through an appropriately positioned exhaust port shown at "$X_2$." Since the direct drive clutch and the overdrive servo then are energized simultaneously while the other gear control elements are de-energized, the transmission will assume overdrive operation as previously explained.

The front clutch will remain applied until the pressure build-up in passage 258' and on the apply side of the overdrive servo is sufficient to cause the overdrive servo to become partially engaged. At that time the pressure in passage 258, since it acts on a relatively large area, will shift the overdrive transition valve to the right, as viewed in FIGURE 2, against the force of the line pressure acting upon the relatively small land on the right hand end of the transition valve. This shift will occur relatively quickly since minimum amount of overlap in the application of the overdrive servo and the release of the front clutch is desired on a "power on" upshift. A torque delivery path interruption and a smooth transistion from one ratio to the other thus is obtained.

The same desired overlap in the operation of the front clutch and the overdrive servo is obtained as a downshift is initiated from overdrive to direct drive. That is, the front clutch may be applied before the overdrive servo is fully released.

If an upshift is obtained under zero torque conditions, (e.g. on a so-called "lift-foot" upshift from direct drive to overdrive), it is desirable to allow the clutch to remain applied a relatively longer time following an upshift of the overdrive shift valve. Under these conditions the torque is delivered through the overdrive gear unit 94 in a reverse direction. That is, the ring gear 92 becomes a power input element and the carrier 96 becomes a driven element. There then will be a tendency for the inner race 88 of coupling 86 to pull away from the outer race. It then becomes necessary to maintain the overdrive gear unit 94 in a locked-up condition until the overdrive brake band 214 is capable of accommodating reaction torque. This requires a synchronous action between the brake and the clutch on a "power off" upshift. The corresponding "power on" upshift, on the other hand, may be relatively non-synchronous.

To establish the necessary shift point for a synchronous "power off" upshift into overdrive, pressure is distributed to the transition valve through passage 306' thereby delaying the shifting movement of the transition valve spool. The pressure signal for passage 306' is obtained from the coast downshift valve which establishes communication between passage 306' and passage 306 the latter being supplied with control pressure by the manual valve. The coast downshift valve establishes such communication, however, only when the throttle pressure in passage 246 is near zero. This corresponds to a zero engine throttle position.

Reverse drive may be obtained by moving the manual valve element in a leftward direction to the position indicated by the letter "R" thus causing fluid pressure to be transferred from passage 242' to passage 294 which extends to the apply side of the reverse servo. Control pressure is free to pass from the branch passage 260 to the passage 246 to energize the front clutch as during direct drive and low speed ratio operation. Control pressure is also distributed to the upper end of the low direct shift valve through a branch passage 296 thereby rendering the low direct shift valve insensitive to variations in vehicle speed. In addition, control pressure is transferred during reverse drive to the pilot regulator valve to urge the same in an upward direction to increase the control pressure level thereby adapting the transmission clutch and brake means for the increased torque reaction accompanying reverse drive operation.

By preference a low direct accumulator is provided as shown in FIGURE 2. It comprises a chamber within which is positioned a movable piston member 298, the portion of the chamber on one side of the member 298 communicating with control pressure passage 252 and the portion of the chamber on the other side of the member 298 communicating with passage 292". The accumulator serves to delay the operation of the direct drive clutch thereby preventing an undesirable sudden application of the clutch. This cushioning effect takes place regardless of the magnitude of the pressure level at which the main regulator valve is operating.

An overdrive direct down shift can be obtained by opening the engine throttle until the overdrive down shift valve allows pressure to pass from passage 242' to passage 299, the latter communicating with the upper end of the overdrive shift valve.

A low direct down shift can be obtained by moving the engine throttle linkage mechanism to a wide open throttle position thereby urging a plunger 300 of the low direct down shift valve in a right hand direction, as viewed in FIGURE 2, to unseat a ball check valve 302 and permit throttle pressure to pass from the aforementioned throttle pressure passage 284 to a passage 304, the latter extending to the low direct shift valve and the overdrive shift valve for subjecting the same to throttle pressure thereby supplementing the biasing action of the respective throttle springs at vehicle speeds greater than a predesigned value. A down shift will occur by reason of the supplementary valve biasing force.

The forced down shift control valve operates to vary the rate of exhaust of fluid from the release side of the low speed servo piston when fluid pressure is delivered to the apply side of the same to effect a shift from direct drive into low speed ratio operation. Since a greater time is required to accelerate the engine over a given speed range while operating at higher engine speeds than the corresponding time required to accelerate the engine while operating at lower engine speeds, the forced down shift control valve is adapted to function to restrict the pressure discharge passage when the vehicle governor pressure exceeds a predesigned value and permit an unrestricted flow of fluid from the release side of the low speed servo when the vehicle governor pressure is below that predesigned value.

The coast down shift control valve, which may be described as a shuttle valve or a two-position timing valve, is somewhat similar in operation to the forced down shift control valve although it responds to throttle pressure rather than governor pressure. Throttle pressure acts upon one end of the coast down shift control valve and a valve spring acts in the opposite direction. When the vehicle operator closes the throttle during coasting operation, the throttle pressure is reduced in magnitude thereby causing the coast down shift control valve to move to the right under spring pressure and restrict partially the exhaust passage extending to the release side of the low speed servo while simultaneously allowing control pressure to pass from passage 306 to passage 306′, the latter extending to the overdrive transition valve which is urged to the left by this control pressure to supplement the biasing action of the control pressure in passage 246 acting on the end of the valve.

It will be apparent from the foregoing description that the front pump 134 will be inoperative whenever the transmission shifts into overdrive. Under these conditions the capacity of the rear pump 203 is sufficient to meet the pressure requirements of the entire circuit and the forementioned check valve 224 adjacent the discharge side of the front pump 134 will close. Also, a similar check valve 308 located at the discharge side of the rear pump 203 will open. Under certain conditions it will be possible for both of the check valves 224 and 308 to be open simultaneously. Also, it is possible for the rear pump to supply the entire pressure requirements of the circuit although the overdrive up shift has not occurred. For purposes of the present discussion, however, these special operating conditions need not be considered.

When check valve 308 opens and check valve 224 closes, the valve land 310 on the main regulator valve will become unseated from its associated valve seat thereby causing pressurized fluid to bypass from passage 242 to passage 240. The valve land 310 therefore functions in a manner similar to the aforementioned valve land 238 to maintain the desired control pressure level. The front pump 134 is rendered inoperative during this overdrive operation by the overdrive brake band 214 as previously explained. Therefore fluid circulation from passage 220 around the valve land 238 to bypass passage 240 and the energy dissipation required to establish such circulation will cease after the need for the front pump no longer exists.

Having thus described a preferred embodiment of my invention, what I claim and desire to secure by United States Letters Patent is:

1. In a power transmission mechanism capable of delivering driving torque through a geared power flow path from a driving member to a driven member, an engine drivably connected to said driving member, clutch means and brake means for controlling the relative motion of said elements whereby different speed ratios can be obtained, a fluid pressure source, conduit structure connecting said pressure source with both said clutch means and said brake means, first and second portions of said conduit structure extending to said brake means and said clutch means respectively, a transition valve defining a part of one of said conduit structure portions and communicating with the other conduit structure portion, a fluid pressure distributor valve means disposed in and partly defining said first conduit structure portion for selectively pressurizing and exhausting the same, an exhaust port formed in said transition valve, said transition valve responding to a pressure build-up in said one conduit structure portion to exhaust said other conduit structure portion, a source of an engine torque sensitive signal pressure, and timing valve means having portions communicating with said transition valve for modifying the time of response of said transition valve in accordance with changes in the magnitude of said signal pressure.

2. In a power transmission mechanism capable of delivering driving torque from a driving member to a driven member, a hydrokinetic unit having an impeller and a turbine disposed in toroidal fluid flow relationship, a multiple speed ratio gear unit having elements that cooperate with said hydrokinetic unit to define plural torque delivery paths between said driving member and a power input element connected to said turbine and said driven member, clutch means and brake means for controlling the relative motion of said elements, an overrunning coupling defining in part a one-way torque delivery path that is parallel to the portion of the torque delivery path defined by said gear unit, a fluid pressure source, conduit structure connecting said pressure source with both said clutch means and said brake means, first and second portions of said conduit structure extending to said brake means and said clutch means respectively, a transition valve having a portion thereof communicating with and partly defining said second conduit structure portion, a fluid pressure distributor valve means in and partly defining said first conduit structure portion for selectively pressurizing and exhausting a fluid pressure sensitive part of said brake means, another portion of said transition valve communicating with said first conduit structure portion, an exhaust port formed in said transition valve, said transition valve responding to a pressure build-up in said brake means to exhaust said clutch means, said transition valve having formed thereon a pressure area, a fluid pressure passage communicating with said pressure area, and a torque demand sensitive valve means for alternately opening and blocking said pressure passage in response to changes in torque demand.

3. In a power transmission mechanism capable of delivering driving torque from a driving member to a driven member, a hydrokinetic unit having an impeller and a turbine disposed in toroidal fluid flow relationship, a multiple speed ratio gear unit having a power input element connected to said turbine and a power output element connected to said driven member, means for controlling the relative motion of said elements, an overdrive gear unit having a ring gear, a sun gear, a carrier and planet pinions journaled upon said carrier in meshing engagement with said sun and ring gears, said carrier being connected to said driving member, said ring gear being connected to said impeller, clutch means for releasably connecting together two elements of said overdrive gear unit, brake means for anchoring selectively said sun gear in sequence with the operation of said clutch means, an overrunning coupling defining in part a torque delivery path that is parallel to the torque delivery path defined by said overdrive gear unit, said parallel torque delivery path being capable of delivering driving torque from said driving member to said impeller in one direction and accommodating overdriving motion of said impeller with respect to said driving member, a fluid pressure source, conduit structure connecting said pressure source with both the clutch means and the brake means for said overdrive gear unit, first and second portions of said conduit structure extending to said brake means and said clutch means respectively, a transition valve having a portion thereof communicating with and partly defining said second conduit structure portion, a fluid pressure distributor valve means disposed in and partly defining said first conduit structure portion for selectively presurizing and exhausting a fluid pressure sensitive part of said brake means, another portion of said transition valve communicating with said first conduit structure portion, said transition valve responding to a pressure change in said brake means to interrupt distribution of fluid pressure from said source to said clutch means, a fluid pressure passage communicating with said transition valve and adapted to distribute thereto a control pressure that modifies the pressure response of said transition valve upon a build-up of pressure in said brake means, and torque demand responsive valve means for establishing and disestablishing distribution of the control pressure through said passage.

4. In a power transmission mechanism capable of delivering driving torque from a driving member to a driven member, a hydrokinetic unit having an impeller and a turbine disposed in toroidal fluid flow relationship a multiple speed ratio gear unit having a power input element connected to said turbine and a power output element connected to said driven member, means for controlling the relative motion of said elements, a planetary gear unit having a ring gear, a sun gear, a carrier and planet pinions journaled upon said carrier in meshing engagement with said sun and ring gears, said carrier being connected to said driving member, said ring gear being connected to said impeller, clutch means for releasably connecting together two elements of said planetary gear unit, brake means for anchoring selectively said sun gear in sequence with the operation of said clutch means, an overrunning coupling defining in part a torque delivery path that is parallel to the torque delivery path defined by said planetary gear unit, said parallel torque delivery path being capable of delivering driving torque from said driving member to said impeller in one direction and accommodating overdriving motion of said impeller with respect to said driving member, a fluid pressure source, conduit structure connecting said pressure source with both the clutch means and the brake means for said planetary gear unit, first and second portions of said conduit structure extending to said brake means and said clutch means respectively, a transition valve having a portion thereof communicating with said second portion, a fluid pressure distributor valve means disposed in and partly defining said second portion for selectively pressurizing and exhausting a fluid pressure sensitive part of said brake means, another portion of said transition valve communicating with and partly defining said first conduit structure portion, an exhaust port formed in said transition valve, said transition valve responding to a pressure build-up in said brake means to exhaust said clutch means, a pressure passage communicating with said transition valve and adapted to distribute thereto a control pressure that influences the response of said transition valve to a pressure build-up in said brake means, a source of torque demand sensitive pressure, and shuttle valve means for alternately blocking and establishing fluid pressure distribution through said passage means, said torque demand sensitive pressure acting upon said pressure distributor valve means and said shuttle valve means, a decrease in the engine torque demand pressure for any given operating condition thereby resulting in actuation of said shuttle valve means to condition the latter for pressure delivery to said transition valve.

5. In a power transmission mechanism capable of delivering driving torque from a driving member to a driven member, a hydrokinetic unit having an impeller and a turbine disposed in toroidal fluid flow relationship, a multiple speed ratio gear unit having a power input element connected to said turbine and a power output element connected to said driven member, means for controlling the relative motion of said elements including a first brake means for anchoring one element of said gear unit, an overdrive gear unit having a ring gear, a sun gear, a carrier and planet pinions journaled upon said carrier in meshing engagement with said sun and ring gears, said carrier being connected to said driving member, said ring gear being connected to said impeller, clutch means for releasably connecting together two elements of said overdrive gear unit, second brake means for anchoring selectively said sun gear in sequence with the operation of said clutch means, an overrunning coupling defining in part a torque delivery path that is parallel to the torque delivery path defined by said overdrive gear unit, said parallel torque delivery path being capable of delivering driving torque from said driving member to said impeller in one direction and accommodating overrunning motion of said impeller with respect to said driving member, a fluid pressure source, conduit structure connecting said pressure source with both the clutch means and the second brake means for said overdrive gear unit, first and second portions of said conduit structure extending to said clutch means and said second brake means respectively, a transition valve having a portion thereof communicating with said second portion, a fluid pressure distributor valve means in and partly defining said second portion for selectively pressurizing and exhausting a fluid pressure sensitive part of said second brake means, another portion of said transition valve communicating with said first conduit structure portion, an exhaust port formed in said transition valve, said transition valve responding to a pressure build-up in said second brake means to exhaust said clutch means, a pressure passage communicating with said transition valve and adapted to distribute thereto a control pressure that influences the response of said transition valve to a pressure build-up in said first brake means, a source of torque demand sensitive pressure, shuttle valve means for alternately blocking and establishing fluid pressure distribution through said passage means, said torque demand sensitive pressure acting upon said pressure distributor valve means and said shuttle valve means, a decrease in the engine torque demand pressure for any given operating condition thereby resulting in an interruption of pressure delivery to said first brake means and a shifting movement of said shuttle valve means whereby the latter is conditioned for pressure delivery to said transition valve, said conduit structure including a portion extending from said pressure source to the controlling means for said multiple speed ratio gear unit of which said first brake means forms a part, said shuttle valve means forming a portion of said last-mentioned conduit structure portion and including a flow restricting orifice disposed in parallel relationship with respect to said last-mentioned conduit structure portion, said shuttle valve means directing fluid flow between said controlling means and said source around said orifice when it assumes a passage opening position.

6. In a power transmission mechanism capable of delivering driving torque through a geared power flow path from a driving member to a driven member, an engine drivably connected to said driving member, clutch means and brake means for controlling the relative motion of said elements whereby different speed ratios can be obtained, a fluid pressure source, conduit structure connecting said pressure source with both said clutch means and said brake means, first and second portions of said conduit structure extending to said brake means and said clutch means respectively, a transition valve defining a part of one of said conduit structure portions and communicating with the other conduit structure portion, a fluid pressure distributor valve means disposed in and partly defining said first conduit structure portion for selectively pressurizing and exhausting the same, an exhaust port formed in said transition valve, said transition valve responding to a pressure build-up in said one conduit structure portion to exhaust said other conduit structure portion, a source of an engine torque sensitive signal pressure, and timing valve means having portions communicating with said transition valve for modifying the time of response of said transition valve in accordance with changes in the magnitude of said signal pressure, said timing valve means comprising a movable valve element, an auxiliary passage extending from said timing valve means to said transition valve, a pressure supply passage and an exhaust passage communicating with said timing valve means, said timing valve means being in fluid communication with said signal pressure source whereby said movable valve element shifts in response to changes in the magnitude of said signal pressure to block and to pressurize alternately said auxiliary passage.

References Cited by the Examiner

UNITED STATES PATENTS

| | | |
|---|---|---|
| 2,876,656 | 3/1959 | Herndon. |
| 2,882,756 | 4/1959 | Polomski. |
| 2,888,834 | 5/1939 | Lowe. |
| 2,934,976 | 6/1960 | Herndon _____ 74—761 X |
| 2,949,794 | 8/1960 | Boehm _____ 74—781 X |

DAVID J. WILLIAMOWSKY, *Primary Examiner.*

DON A. WAITE, *Examiner.*

T. C. PERRY, *Assistant Examiner.*